US005607587A

United States Patent [19]
Langner

[11] Patent Number: 5,607,587
[45] Date of Patent: Mar. 4, 1997

[54] SCREENING APPARATUS FOR WOOD PULP

[76] Inventor: Herbert G. J. Langner, 1175 Appleby Line, #C-3, Burlington, Ontario, Canada, L7L 5H9

[21] Appl. No.: 514,517

[22] Filed: Aug. 11, 1995

[51] Int. Cl.[6] .................................................. B01D 33/06
[52] U.S. Cl. ...................... 210/380.3; 210/402; 210/403; 209/270; 209/288
[58] Field of Search ................................. 210/380.3, 378, 210/391, 396, 402, 403; 209/270, 288, 369

[56] References Cited

U.S. PATENT DOCUMENTS 2,734,635  2/1953  Holzenthal .............................. 210/378
3,876,548  4/1975  Welles, Jr. .............................. 210/391
5,490,928  2/1996  Tanii ..................................... 210/380.3

Primary Examiner—David A. Reifsnyder
Attorney, Agent, or Firm—Riches, McKenzie & Herbert

[57] ABSTRACT

A rotary screening device is disclosed which may be advantageously used to increase the solid content of influent. The apparatus includes a rotating cylinder having an inlet end, an outlet end and, depending on the material to be screened, a cylindrical wall formed at least partly from a screening surface, such as a woven wire mesh screen. The cylinder is journalled for rotation about its central axis, which may be either in a horizontal position or inclined up to 40 degrees from horizontal towards either the inlet or outlet end. Each end of the screening cylinder has its lowermost portion covered to restrict outward movement of the influent from the cylinder and maintain a minimum layer of retained solids therein.

19 Claims, 4 Drawing Sheets

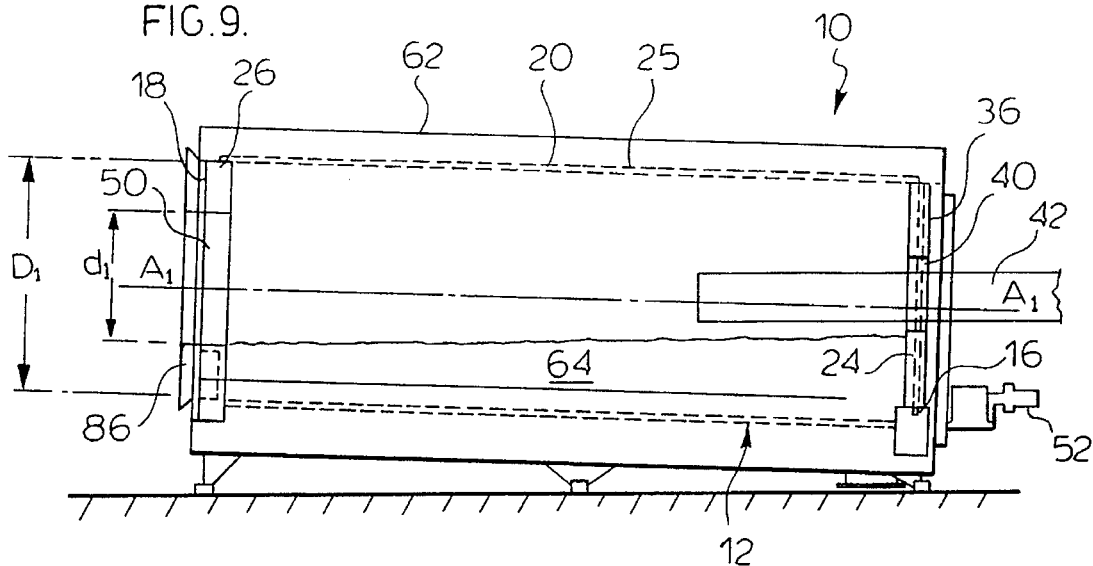
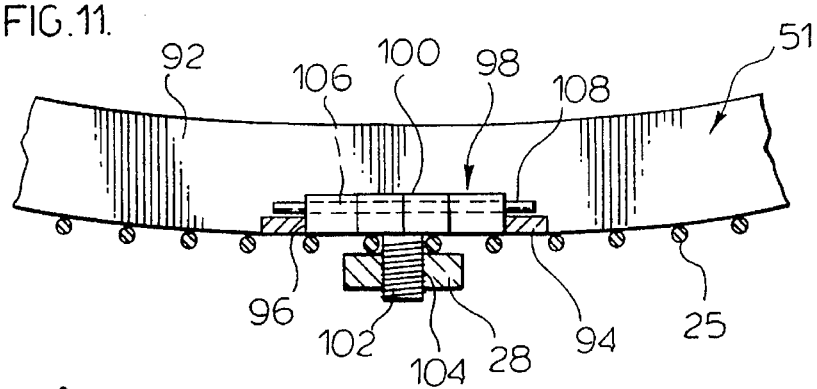
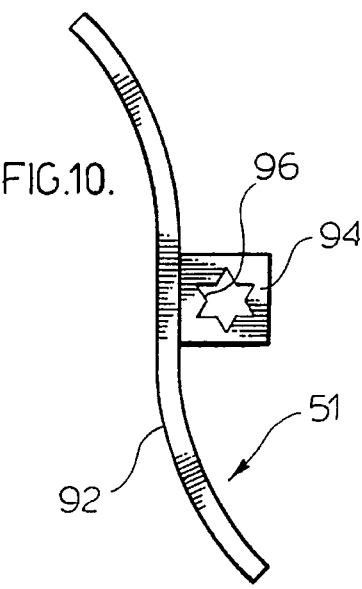
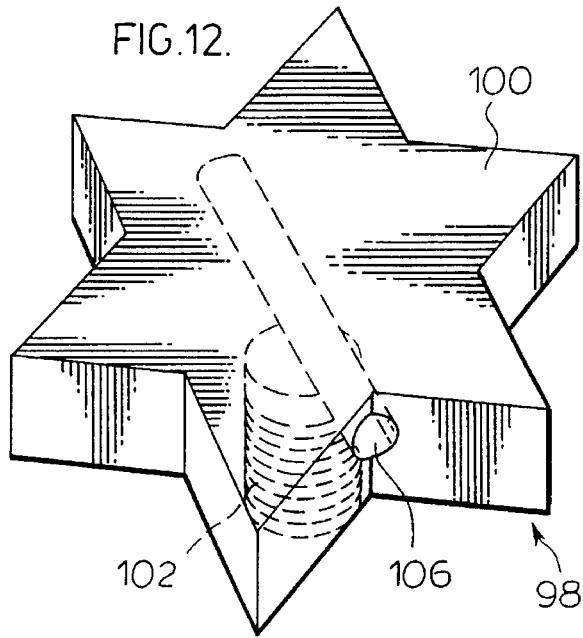

SCREENING APPARATUS FOR WOOD PULP

SCOPE OF THE INVENTION

This invention relates to a rotary screening apparatus for separating solids and filtrate from an influent stream and more particularly, to a screening apparatus having a rotating cylindrical screen which is particularly suited for screening wood pulp.

BACKGROUND OF THE INVENTION

Rotating screens are known for use in many applications including municipal sewage and sludge treatment and food processing. Typically conventional screening devices have a hollow screening cylinder which is journalled for rotation about a horizontally oriented axis. Influent to be screened is fed into the interior of the rotating cylinder onto the screening surface. Filtrate from the influent then passes under gravity through openings in the screening surface, leaving behind solids which are too large to move through in the screens. As the cylinder rotates, solids retained internally within the cylinder are moved along the interior of the cylinder to a discharge outlet.

Conventional screening devices suffer the disadvantage in that the separation of the solid portions of the influent from the filtrate is achieved solely as a result of the aperture size and the screening surface. Practically therefore, there is a need to strike a balance between having a cylinder screen with a mesh size which is so large as to permit large quantities of solid portions to readily move through the screen openings, and a cylinder screen with a mesh size which is so small as to become clogged or otherwise hinder drainage of the filtrate.

The use of rotary screening devices in the pulp and paper industry to increase the solid content of wood pulp has also been proposed. Typically, however, such conventional screening surfaces are formed having wedge wire screens, as for example is described in U.S. Pat. No. 3,876,548. Wedge wire screens are formed from a plurality of parallel screen bars which have an outer face and angled sides. Wedge wire screens have been found to be inefficient in separation on removal of liquids as fluid therein tends to flow as a sheet across the flat inward facing wire surfaces, rather than through the screen opening, as the screening drum rotates. In addition to being inefficient in separation of liquids from solids, wedge wire screens have been found particularly unsuitable for use in treating wood pulp, as elongate pulp fibres tend to collect within and clog openings in the screens, preventing the proper outward movement of filtrate from the cylinder and necessitating repeated cleaning of the apparatus increasing down time.

SUMMARY OF THE INVENTION

Accordingly, to at least partially overcome the disadvantages of previously known devices, the present invention provides a rotary screening device which, in addition to the screening surface, utilizes at least some of the solid portions of the influent which are retained in the cylinder as a filtering medium. The use of retained portions from the influent as a filtering medium advantageously allows comparatively larger mesh screens to be used, without significant loss of solid portions in the influent with the filtrate.

To overcome other disadvantages to the prior art, the present invention provides a rotary screening device for increasing the solid content of wood pulp, which incorporates a screening cylinder having a cylinder wall formed from a woven wire mesh screen. It has been found that the use of a woven wire mesh screen advantageously reduces clogging of the screening cylinder by elongate pulp fibers. The rounder profile of the woven mesh screen has been found to reduce fluid sheeting across the cylinder surface. In particular, the woven wire mesh screen has been found to increase mixing and fluid turbulence adjacent the cylinder surface to thereby reduce sheeting along the cylinder walls and produce better drainage.

Accordingly, it is an object of the present invention to provide a rotary screening device for use in increasing the solid content of wood pulp which minimizes clogging of the screening cylinder and down time.

It is another object of the present invention to provide a rotary screening apparatus for increasing the solid content of influent which can maximize screen aperture size without permitting the loss of large quantities of solids together with filtrate.

Another object of the invention is to provide a rotary screening apparatus in which the screening cylinder is provided with partially closed ends so as to maintain a minimum level of solid portions from the influent in the cylinder for use as a filtering medium.

A further object of this invention is to provide over an outlet end of the screening cylinder, a frustoconical shaped cover which is configured to preferentially output from the cylinder the uppermost portion of the influent layer which is being screened therein.

Another object of the invention is to provide a rotary screening device in which the residence time of the influent in the cylinder may be increased or decreased, depending on the desired solid content to be achieved.

The inventor has appreciated an improved rotary screening device may be advantageously used to increase the solid content of influent. The apparatus includes a rotating cylinder which is formed having an inlet end, an outlet end and, depending on the material to be screened, a cylindrical wall formed at least partly from a screening surface. The screening surface may for example be a woven wire mesh screen, or in a highly less preferred embodiment, a wedge wire screen or another conventional screen. The cylinder is journalled for rotation about its central axis, which may be either in a horizontal position or inclined up to 40 degrees from horizontal towards either the inlet or outlet end. Preferably, the cylinder axis inclines upwardly from the inlet end of the cylinder towards the outlet end at between 0 and 15 degrees, and more preferably between 1 and 5 degrees from horizontal.

The device may be used in food processing or to treat sewage or sludge with little modification. Where the screening device is to be used to increase the solid content of wood pulp, it has been found to be preferable to form the cylindrical wall substantially in its entirety from woven wire mesh screen, so that the disadvantageous clogging of the screen openings which occurs with conventional wedge wire screens is avoided. The inventor has discovered that the present invention may be used to increase the solid content of wood pulp to more than 4% by weight, and if desired, as high as 10% by weight without dewatering additives, or with polymer dewatering additives as high as 18% by weight.

In a more preferred embodiment of the invention, each end of the screening cylinder has its lowermost portion covered to restrict outward movement of influent outwardly from the interior of the cylinder, and thereby maintain therein a minimum layer of retained solids or portions of the influent which do not pass through the openings in the mesh screens. The minimum layer of retained portions is preferably maintained between the ends of the cylinder having a thickness of at least 3" along a longitudinal vertical center of the screening cylinder. The minimum layer maintained in the cylinder advantageously acts as a filter bed to further filter solid portions from the influent slurry, with the result that fewer solid portions are lost with the filtrate, and output portions of the influent have a lower liquid content.

The inlet and outlet ends of the cylinders may be covered by end plates or covers which are fixed in place so as to permit relative movement of the cylinder, however, in a more simplified construction, the inlet and outlet end plates or covers are coupled over the ends of the cylinder for rotation therewith. The inlet end cover and outlet end cover may, for example, be formed as annular rims which extend about the inlet and outlet ends and define inlet and outlet openings therethrough. Preferably, the inlet opening is either sealed by an influent inlet tube or the like, or is formed so that, having regard to the inclination of the cylinder axis, is vertically positioned above the outlet opening so that the lowermost extent of the outlet opening controls the level of the layer of solid retained portions which is maintained between the inlet and outlet end covers.

The outlet end cover is preferably provided with a frustoconical shape, tapering inwardly towards the cylinder axis to define the outlet opening. The sloping sidewalls which provide the outlet end cover with its frustoconical shape advantageously redirect filtrate which passes outwardly from the outlet end back into the cylinder. The outlet end cover may be formed of solid steel for simplified construction, or if desired may include sidewalls formed either entirely or in part from one or more screening surfaces. The outlet end cover may also be configured so that the diameter or size of the outlet opening may be varied. In this manner, by changing the diameter of the outlet opening the lowermost extent of the outlet opening may be raised or lowered, to vary the thickness of the layer of solid portions retained in the cylinder.

Accordingly in one aspect, the present invention resides in a method of increasing the solid content in a wood pulp slurry to greater than 4% by weight by the use of a rotary screening apparatus including:

a hollow cylinder having its central axis oriented at approximately 0° to 15° inclination from horizontal, the cylinder journalled for rotation about the central axis, and including a generally cylindrical wall, an inlet end, and an outlet end, said cylindrical wall comprising a woven wire mesh screening surface having apertures therethrough of a size selected to permit the passage of filtrate, conveying means for conveying said slurry into the interior of the cylinder, and rotation means for rotating said cylinder, wherein on rotation of the cylinder, retained portions of said wood pulp which do not move through said screening surface are moved along the cylinder from the inlet end towards and outwardly from the outlet end, said method comprising the steps of:
(a) conveying said wood pulp slurry into the interior of the cylinder via the inlet end,
(b) rotating said cylinder by said rotation means, and
(c) collecting said retained portions which are moved outwardly from the outlet end,
whereby steps (a) to (c) are performed concurrently as a continuous process.

In another aspect, the present invention resides in the use of a rotary screening device for increasing the solid content of an influent slurry, said device comprising, a hollow cylinder having a central axis oriented at between 0° and 15° inclination from horizontal, the cylinder journalled for rotation about the central axis and including an inlet end, an outlet end, and a cylindrical wall which comprises substantially in its entirety a screening surface, inlet end covering means extending radially inwardly towards said axis from a peripheral portion of said inlet end, said inlet end covering means defining an inlet opening and substantially preventing fluid movement outwardly from said device between the peripheral portion of said inlet end and said inlet opening, outlet end covering means extending radially inwardly towards said axis from a peripheral portion of said outlet end, said outlet end covering means defining an outlet opening and substantially preventing fluid movement outwardly from said device between the peripheral portion of said outlet end and said outlet opening, rotation means for rotating the cylinder about said axis, conveying means for directing said influent slurry into the interior of the cylinder via the inlet opening, and collection means under the cylinder to collect filtrate from the slurry which passes through the screening surface, wherein while said cylinder is rotated by said rotation means, said conveying means is activated to direct said influent slurry into said cylinder and onto said screening surface, on said slurry contacting said screening surface filtrate passing therethrough and portions of the influent slurry which do not pass through said screening surface are moved along the cylinder towards the outlet opening, the inlet end covering means and the outlet end covering means preventing movement of some of said portions out of the respective outlet opening to maintain a minimum level of retained portions in said cylinder at substantially the same level as a lowermost extent of said outlet opening, the layer of retained portions maintained in said cylinder further filtering portions from said influent slurry.

In a further aspect, the present invention resides in a rotary screening apparatus for increasing the solid content of influent, said apparatus comprising, a hollow cylinder having a central axis oriented at approximately 0° to 40° inclination from horizontal, the cylinder journalled for rotation about the central axis and including an inlet end, an outlet end and a generally cylindrical wall comprising substantially in its entirety a screening surface, inlet end covering means for covering said inlet end, said inlet end covering means extending from the cylindrical wall radially inwardly towards the axis and defining an inlet opening spaced towards said axis, outlet end covering means for covering said outlet end, the outlet end covering means extending from the cylindrical wall, radially inwardly towards the axis and defining an outlet opening spaced towards said axis, conveying means for delivering said influent into the interior of said cylinder via said inlet opening, and rotation means for rotating said cylinder about the axis.

BRIEF DESCRIPTION OF THE DRAWINGS

Further aspects and advantages of the present invention will appear from the following description together with accompanying drawings in which.

FIG. 9 shows a schematic side view of a rotary screening device in accordance with a second embodiment of the invention;

FIG. 10 shows a top perspective view of a preferred diverter vane for use with the screening device of FIG. 1;

FIG. 11 shows an enlarged partial schematic side view of the diverter vane of FIG. 10 with a coupling bolt inserted therein; and FIG. 12 shows an enlarged schematic top view of a coupling bolt for use in securing the diverter vane of FIG. 10 within the screening device.

DETAILED DESCRIPTION OF THE DRAWINGS

Figure 1:
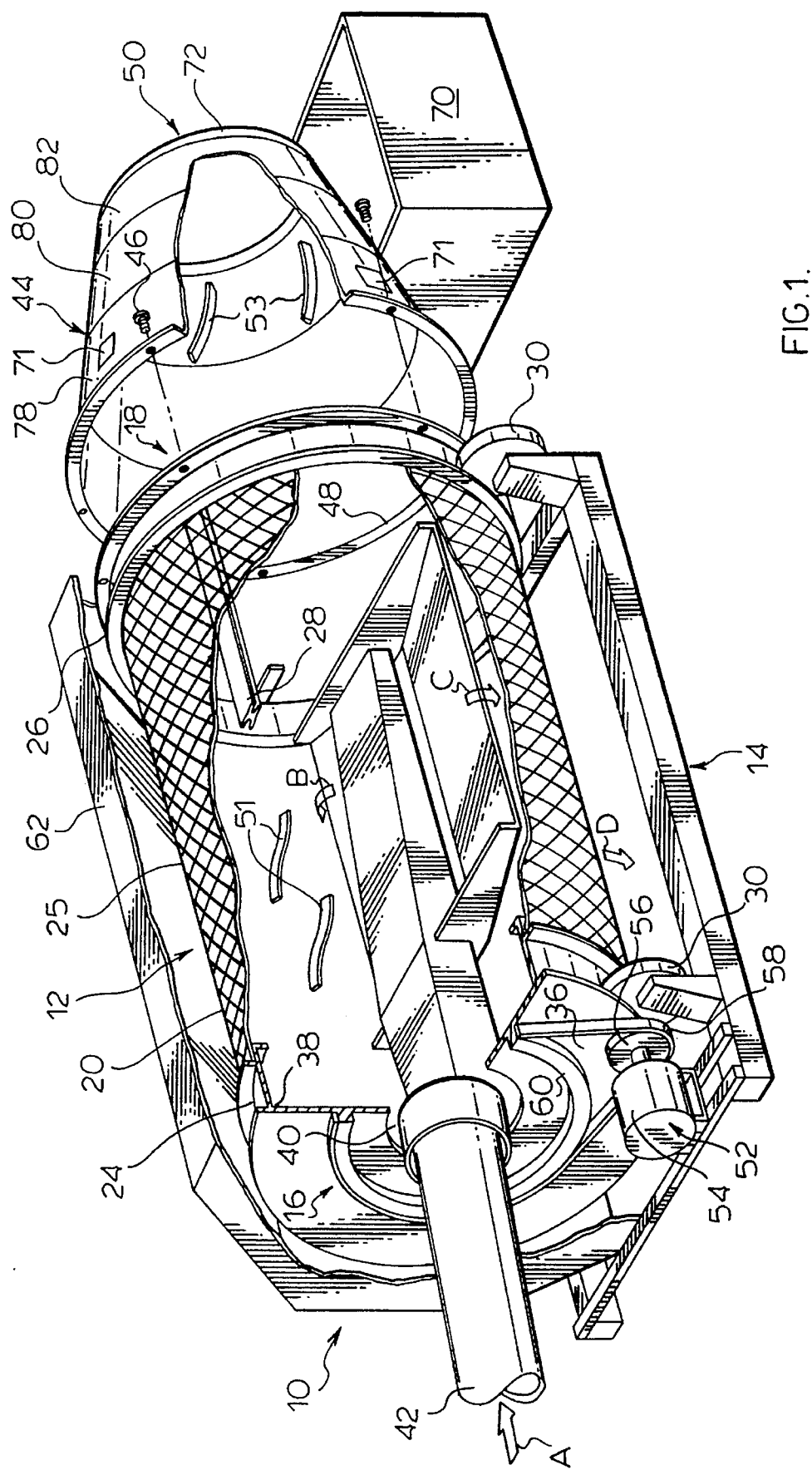
FIG. 1 is a partially cut-away pictorial view showing a rotary screening device in accordance with the preferred embodiment of the invention.

Reference is made first to FIG. 1 which shows a pictorial view of a rotary screening device 10 in accordance with a preferred embodiment of the present invention. The device 10 includes a hollow cylinder 12 used to separate solids and filtrate from a wood pulp slurry, and a frame 14 which rotatably supports the cylinder 12.

The cylinder 12 includes an inlet end 16 through which an influent of untreated wood pulp slurry enters the interior of the cylinder 12, an outlet end 18 through which treated wood pulp moves outwardly from the cylinder 12, and a cylinder wall 20 which is used to screen solid portions in the influent slurry from the filtrate. FIG. 1 shows best the cylinder wall 20 as being formed substantially in its entirety of a steel woven wire mesh screen 25. To provide structural support for the wire mesh screen 25, the cylinder wall 20 also includes a cylindrical end frame member 24,26 positioned adjacent each of the respective inlet and outlet ends 16,18, and cross-frame members 28. The cross-frame members 28 join the cylindrical end frame members 24,26 on radially opposite sides of the cylinder, with the end frame members 24,26 and cross-frame members 28 formed from steel having a gauge selected to provide the necessary structural integrity to the cylinder 12 depending on the intended use of the device 10. While FIG. 1 illustrates the cylinder 12 as having two end frame members 24,26 and two cross-frame members 28, where larger diameter and/or larger screening cylinders are to be used, additional end and/or cross-frame members are to be provided.

Figure 2:
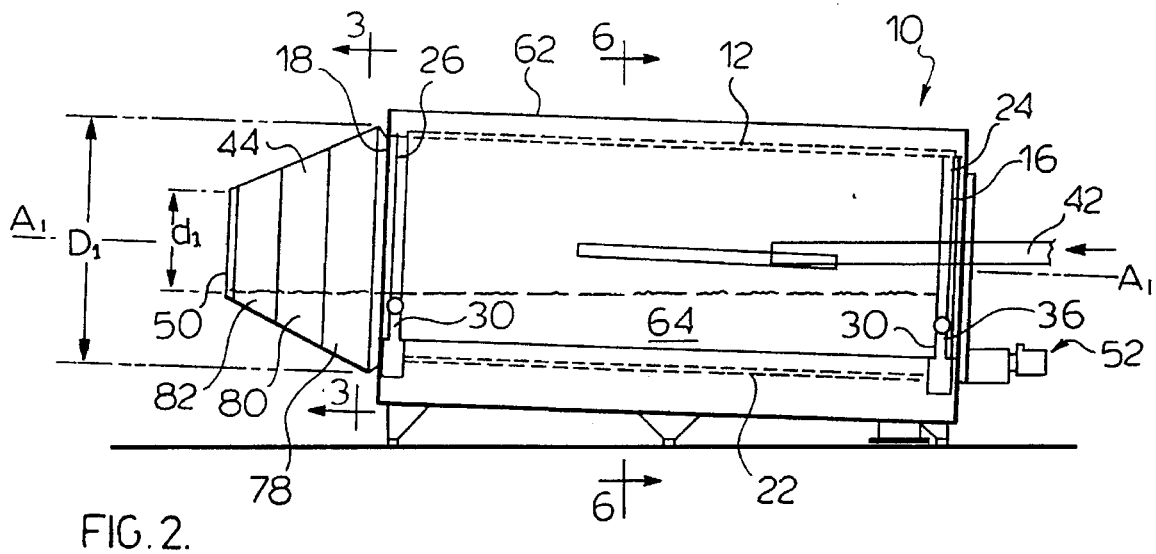
FIG. 2 is a schematic side view of the rotary screening device of FIG. 1.
Figure 3:
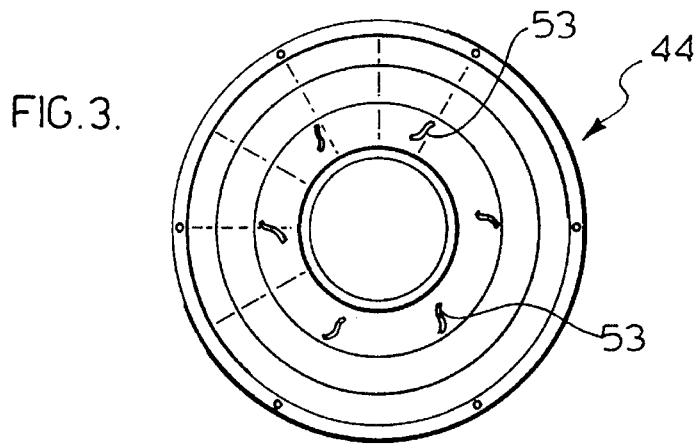
FIG. 3 is a cross-sectional view of the frustoconical end cover shown in FIG. 2 taken along lines 3—3.

FIG. 2 shows the cylinder 12 as being oriented with its central axis $A_1$ inclining upwardly from the inlet end 16 towards the outlet 18 end at approximately 4 degrees from horizontal. The cylinder 12 is journalled for rotation about the axis $A_1$, resting on four rollers 30 which are supported by the frame 14. The rollers 30 are spaced to engage outer surfaces of cylindrical end frame members 24,26 adjacent each respective inlet end and outlet end 16,18. More preferably the outer surface of each end frame member 24,26 is formed as a U-shaped track to assist in maintaining the cylinder 12 in the correct position on the rollers 30.

A solid steel inlet end cover plate 36 is welded over the end of the end frame member 24. The cover plate 36 extends as an annular rim from the peripheral edge 38 of the end frame member 24 radially inwardly, part-way towards the axis $A_1$ defining circular inlet opening 40 into the cylinder centered on the axis $A_1$. The cover plate 36 thereby acts to substantially prevent influent movement outwardly from the cylinder 12 between the peripheral edge 38 and the inlet opening 36.

Figure 5:
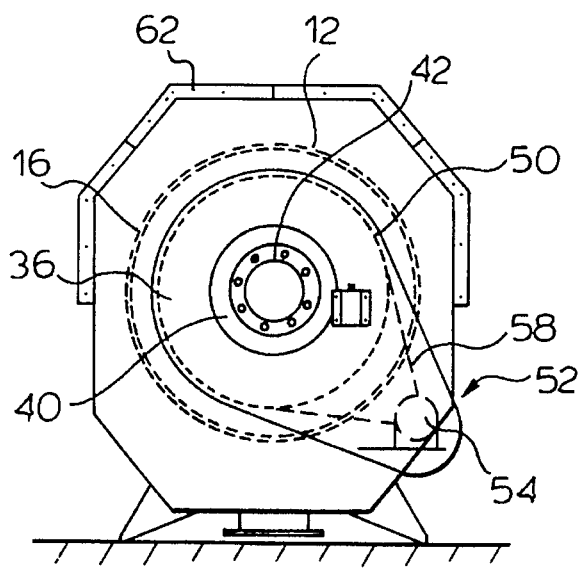
FIG. 5 is a schematic end view of the inlet end of the device of FIG. 1.
Figure 6:
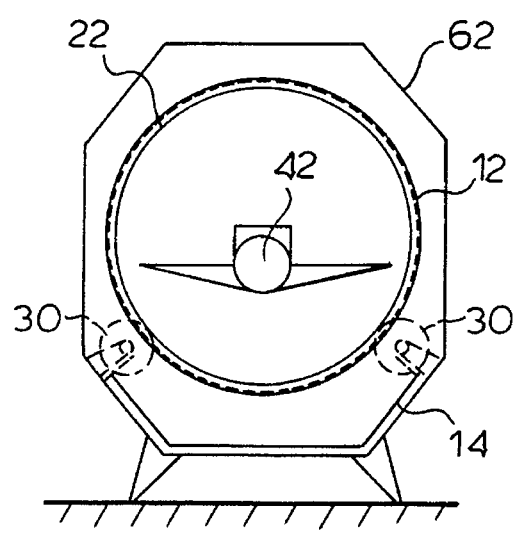
FIG. 6 is a cross-sectional view of the screening cylinder shown in FIG. 2 taken along lines 6—6.

An influent supply tube 42 shown in FIGS. 5 and 6 extends inwardly into the interior of the cylinder 12 through the inlet opening 40. The tube 42 acts as the conduit through which the influent slurry is directed into the cylinder 12.

FIGS. 1 to 4 show an outlet end cover 44, having a frustoconical shape and steel sidewalls and which is coupled to the end of frame member 26 by bolts 46, thereby covering the outlet end 18. The outlet end cover 44 includes a large diameter end portion 48 which has a diameter $D_1$ equal to the diameter of the outlet end opening 18. The cover 44 extends from the large diameter end portion 48 in a direction away from the inlet end 16, tapering inwardly towards the axis $A_1$ to define a smaller diameter circular outlet opening 50 having a diameter $d_1$ and which is centered on the axis $A_1$. The radial diameter $d_1$ of the outlet opening 50 is selected less than the radial diameter $D_1$ of the outlet end 16 so that the lowermost portion of the outlet end 50 is spaced vertically above the lowermost portion of the outlet end 18, and more preferably the diameter $d_1$ is selected so that the ratio of the diameter of the outlet opening 50 to the diameter of the outlet end 18 is less than 2:3. To avoid the need to provide an outlet end cover 44 which is unduly long, preferably the end cover 44 tapers inwardly towards the axis $A_1$ at an angle of between 20° and 40°.

To minimize the likelihood that influent may move outwardly from the cylinder 12 through the inlet opening 40, the relative diameters of the inlet opening 40 and the outlet opening 50 are selected so that, having regard to the inclination of the cylinder axis $A_1$ and the taper and length of the end cover 44, the lowermost extent of the outlet opening 50 is vertically spaced below the lowermost extent of the inlet opening 40. Alternately, the need to ensure that the outlet opening 50 extends vertically below the inlet opening 44 may be avoided if, for example, the sides of the supply tube 42 engage the inlet end cover plate 36 in a rotary seal-type engagement.

As seen best in FIGS. 1 and 5, a number of flights or diverter vanes 51,53 are provided at spaced locations about both the interior of the cylinder 12 as well as the interior of the cover 44, respectively. The vanes 51,53 preferably extend radially inwardly and have a width of at least two inches and a length of at least six inches. The vanes 51,53 are formed from elongate ribbons of metal which assist in moving retained solid portions of the influent outwardly from the cylinder 12 into the frustoconical end cover 44, and outwardly therefrom through the outlet opening 50. The diverter vanes 51,53 may be in the form of a continuous sinuous or radially extending helical vane, or alternately may comprise a series of one or more shorter length vanes arranged in a spiral pattern. Preferably, the vanes 53 in the end cover 44 are spaced a distance from the outlet end 18 and towards the outlet end opening 50 so that wood pulp which is immediately adjacent the outlet opening 50 is preferentially directed outwardly from the device 10.

The cylinder 12 together with both of the end covers 36,44 are driven in rotation by a chain drive unit 52. The chain drive unit 52 includes a drive motor 54 which carries a drive sprocket 56, a drive chain 58 and a driven sprocket 60 which is secured to the end cover 36. The drive sprocket 56 engages the drive chain 58 which passes about the driven sprocket 60. The drive motor 54 rotates the cylinder 12 about its axis $A_1$ with the rollers 30 engaging the U-shaped tracks of the respective end frame members 24,26.

A removable cover 62 is shown about the cylinder wall 20. The cover 62 is not essential, however is preferred as it serves the function of containing and directing filtrate for collection, as well as reducing noise during operation of the device 10.

In operation, an influent wood pulp slurry, which may have a solid content less than 2% by weight, is directed into the interior of the cylinder 12 and onto the screen 25. The influent slurry is conveyed along the supply tube 42 in the direction of arrow A by a pump or screw feed (not shown). It is to be appreciated that where a slurry having a higher solid content is to be treated, a conveyor belt, hopper or other supply mechanism may be used.

Initially, as the slurry is pumped into the cylinder 12, on first contact with the mesh screen 25, filtrate from the slurry passes through the screen 25 under gravity in the direction indicated by arrow D, and material which is to be collected and which is too large to pass through the openings in the screen 25 is retained within the cylinder 12. Because the lowermost extent of the outlet opening 50 is vertically spaced above the bottom of the outlet end 18, and the inlet end 16 is covered by plate 36, a minimum layer of retained material 64 collects in the cylinder 12. The device 10 is preferably configured so that the layer of material 64 maintained in the cylinder 12 between the inlet end 16 and outlet end 18 has a minimum thickness taken along a vertical plane through the axis $A_1$ of at least three inches, and more preferably at least six inches.

On initial pumping of the slurry into the cylinder 12, material continues to collect within the cylinder 12 with the layer of material 64 reaching a sufficient level so that as the cylinder 12 rotates material moves outwardly from the device 10 through the outlet opening 50.

In operation, the slurry is continuously pumped into the cylinder 12 in the direction of arrow C, onto the layer 64. The influent in pumped into the cylinder 12 at the desired rate for output, with faster pumping rates for higher output volumes. In this manner, the minimum thickness of the layer 64 in the cylinder 12 is dictated by the vertical distance between the lowermost portion of the outlet opening 50 and that of the outlet end 18.

The layer of retained portions 64 acts as a filter bed to further filter solids from the slurry as filtrate moves under gravity downwardly through the layer 64 in the direction of arrow D, and outwardly through the mesh screen 25. The retained material collects in the cylinder 12 until the layer 64 of material is substantially level with the lowermost extent of the outlet opening, after which retained portions are moved outwardly from the device 10 by the rotation of the cylinder 12. Further, because the layer 64 acts as a filter bed, it filters finer portions from the influent which to otherwise capture would require the use of a finer mesh screen 25. The result is that solids which are captured and retained by the screen 25 and/or the layer 64 are moved along the interior of the cylinder 12 from the inlet end 16 outwardly from the outward end 18. The portions which move outwardly through end 18 move first into the frustoconical cover 44 and outwardly therefrom via the outlet opening 50 in the cover 44.

With the present apparatus, the bulk of filtration occurs along the half of the cylinder 12 closest the input end 16 and drying occurs over the half closest the outlet end 18. Filtrate which does pass into the cover 44 is redirected back into the cylinder 12 by the tapering side-walls. A collection hopper 70, or other collection device may thus be positioned vertically beneath the outlet opening 50 to receive the output material for further processing.

A number of removable panels 71 are circumferentially spaced about the cover 44 adjacent the end portion 48. The panels 71 seal openings through the cover 44 and are held in place by screws. When the device 10 is no longer in use, the panels 71 may be removed to enable complete drainage of the influent slurry and retained layer 64 from the cylinder 12.

With present device 10, it has been found that the solid content of the output portion of wood pulp may be increased as high as 10% by weight without additives or if dewatering polymers are added, as high as 18% by weight. Further, the solid content of the output portion of the wood pulp may be regulated by controlling the rate at which slurry is input into the cylinder 12. Where a lower solid content is acceptable, the rate of slurry input is increased. As the rate of slurry input increases, the residence time of the wood pulp in the cylinder 12 decreases as a result of increased flow rates within the cylinder 12 towards the outlet opening 50. With a decrease in residence time, the wood pulp has comparatively less time for the filtrate to pass through the screen 22, and a wetter output results. Conversely, if the rate of slurry input is decreased, residence time of the wood pulp in the cylinder 12 increases and a drier output is produced.

The use of a woven mesh or wire screen 25 has also been found to advantageously encourage mixing immediately adjacent to the walls of the cylinder 12 and reduce sheeting of liquid across the cylinder walls 20 as the cylinder 12 is rotated, as the inlet end cover 36 and outlet end cover 44 act to maintain the minimum layer of retained portions 64 along the entire length of the cylinder 12. Further, it is believed that providing a screening device 10 in filtration occurs over the entire length of the screening cylinder 12. This is believed to be both more cost effective and space efficient, in that shorter length cylinders 12 may be used than compared to conventional screening devices.

Figure 7:
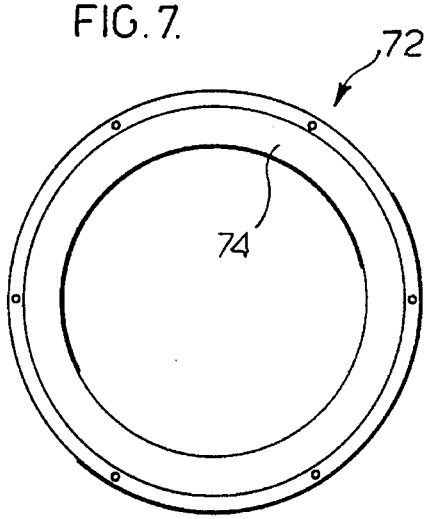
FIGS. 7 and 8 show schematic end views of capping rings for use with the screening device shown in FIG. 1.
Figure 8:
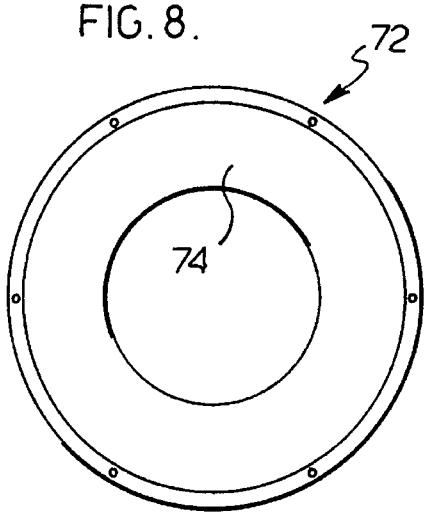

It is to be appreciated that by increasing or decreasing the thickness of the layer of retained portions 64, a corresponding increase or decrease in the efficiency of slurry filtration may be achieved. Preferably, therefore the device 10 is configured to permit the layer of retained portions 64 to be raised or lowered in the cylinder by changing the size of the diameter of the outlet opening 50. In this regard, FIGS. 1, 7 and 8 show one possible device for changing the outlet opening 50, wherein the end cover 44 is provided with a removable annular capping rim 72. The capping rim 72 is mechanically coupled to the end of the cover 44 by bolts (not shown) and includes an inwardly extending flange 74 which defines the diameter of the outlet opening 50. By the selection of a capping rim 72 which has the desired opening diameter, the cover 44 may be easily modified to vary the size of the outlet opening 50.

Figure 4:
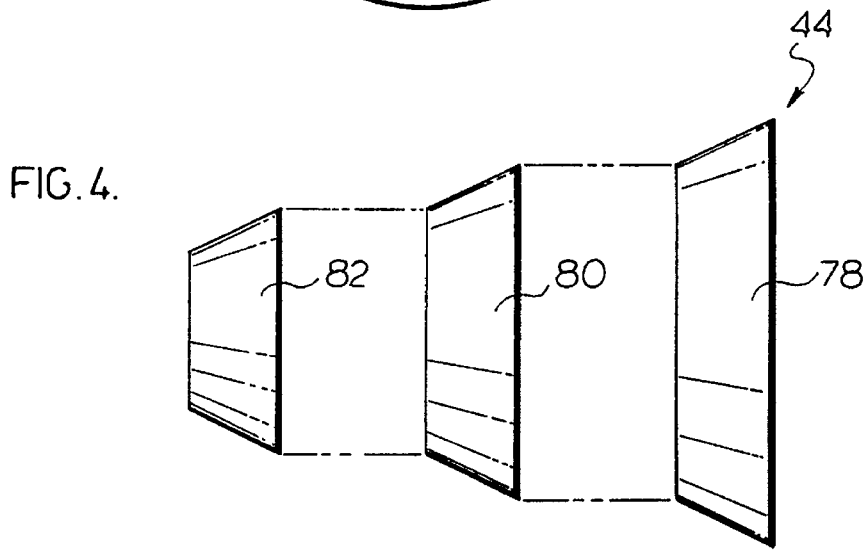
FIG. 4 is a schematic exploded view of the end cover shown in FIG. 3.

While the use of different rim caps 72 permits cost effective and simplified alteration of the diameter of the outlet opening 50, more preferably, the frustoconical end cover 44 is formed from the assembly of detachable frustoconical segments 78,80,82 which each successively reduce in diameter, tapering in the manner shown in FIG. 4. The use of modular segments permits the size and positioning of the outlet opening to be varied, as for example, by attaching a single segment 78 to the end frame member 24 where a larger outlet opening is desired; or where a narrower diameter outlet opening 50 is desired by coupling a number of segments 78,82,84 together. FIG. 4 illustrates the end cover 44 as being formed from three segments 78,80,82, it is to be appreciated however that different numbers of segments may also be used. To provide even greater flexibility, if desired, the individual segments may also be adapted for use with the capping rim of FIGS. 7 and 8.

While an outlet end cover 44 having a frustoconical shape is preferred, other end covers which act to maintain a minimum layer of influent in the cylinder 12 may also be provided and will now become apparent. FIG. 9 shows one such screening apparatus wherein in place of a frustoconical shaped end cover 44, an annular rim end cover 86 is provided. The rim cover 86 has essentially the same construction as that of inlet end cover 36 and extends from a peripheral edge of the end frame member 24 inwardly to define the axially centered outlet opening 50.

The diverter vanes 51,53 direct a portion of the material outwardly first along the interior of the cylinder 12 to the outlet end 18, and then into the frustoconical end cover 44 outwardly through the opening 50 into a collection hopper 70. Because the diverter vanes 53 are spaced away from the outlet end 18 and towards the outlet opening 50, the vanes 53 are also positioned vertically spaced towards the axis $A_1$. The spacing of the vanes 53 advantageously acts to preferentially divert the uppermost portion of the retained layer 64, which has the highest solid content outwardly through the outlet opening 50.

FIGS. 10 to 12 show a preferred diverter vane 51 and coupling bolt 90 for use with the present invention. As seen in the top view shown in FIG. 10 the diverter vane 51 includes a sinuously shaped member 92 which is bent to follow the radial curvature of the cylinder 12, and a generally flat flange 94 which extends outwardly from the middle of one side of the member 92. The flange 94 has formed therethrough a twelve-sided star-shaped aperture 96 used to position the vane 51 along the cylinder wall 22.

FIG. 12 shows best a coupling bolt 98 used to secure the vane 51 in place. The bolt 98 is proved with a twelve-sided star-shaped head 100 having a size and shape selected to complementary fit within the aperture 96. A threaded bottom projection 102 on the bolt 98 is used to couple the bolt 98 within a threaded socket 104 formed in a cross-frame member 28. As seen best in FIG. 11 the bolt head 100 has a transversely extending bore 106 therethrough, and is sized to project a distance upwardly through the flange 94 when inserted in the aperture 96. With this construction the vane 51 may be positioned on the bolt 98 in one of a number of angled positions and secured in place by inserting through the bore 106 a retaining pin 108, or other such cotter-pin or the like.

Although not shown, it is to be appreciated that the diverter vanes 53 in the end cover 44 could have a similar construction for coupling to bolts 98 which are secured to the inner surface of the cover 44.

FIGS. 10 to 12 illustrate a twelve sided star shaped aperture 96 and complementary shaped bolt 98 for use in positioning the vanes 51,53 in the device 10. Other polygonal-shaped apertures and bolt head combinations are also possible and will now become readily apparent.

While inlet and outlet end covers coupled to cylinder 12 advantageously provide a simplified construction, if desired, other inlet and/or outlet end covers which are fixed relative to the inlet and outlet ends 16,18 are also possible.

The frustoconical end cover 44 is disclosed as having a solid steel side-wall construction, however, the invention is not so limited. The end cover 44 could also include one or more screening surfaces. In the case where modular segments 78,80,82 are used to form the cover 44, one or more segments 78,80,82 may have segment walls formed from mesh screens.

The preferred embodiment of the invention discloses the present apparatus for use in increasing the solid content of wood pulp. The screening apparatus is equally suitable for other uses including, for example, increasing the solid content of sewage, sludge and/or food processing. The use of woven wire mesh screens have been found to be highly preferred in the treatment of wood pulp, however, less preferred screens are also possible, particularly in the adaptation of the device 10 in treating other materials.

Although the detailed description describes preferred embodiments of the invention, the invention is not so limited, and many variations and modifications will now occur to persons skilled in this art. For a definition of the invention reference may be had to the appended claims.

I claim:

1. A rotary screening apparatus for increasing the solid content of influent, said apparatus comprising, a hollow cylinder for at least partially drying a portion of influent which is retained therein, said cylinder having a central axis oriented at approximately 0° to 40° inclination from horizontal, the cylinder journalled for rotation about the central axis and including an inlet end, an outlet end and a generally cylindrical wall comprising substantially in its entirety a screening surface for separating a filtrate portion of said influent from said retained portion, inlet end covering means for covering said inlet end, said inlet end covering means extending from the cylindrical wall radially inwardly towards the axis and defining an inlet opening spaced towards said axis, outlet end covering means for covering said outlet end, the outlet end covering means extending from the cylindrical wall, radially inwardly towards the axis and defining an outlet opening spaced towards said axis, conveying means for delivering said influent into the interior of said cylinder via said inlet opening wherein said retained portion is at least partially dried by the movement of said filtrate portion outwardly from said cylinder through said screening surface, rotation means for rotating said cylinder about the axis, and wherein said outlet end cover means comprises a frustoconical member disposed over said outlet end, said frustoconical member having a substantially solid sidewall construction and extending radially inwardly from the outlet end to said outlet opening in a direction away from said inlet end.

2. An apparatus as claimed in claim 1 further including collection means spaced beneath said cylinder for collecting said filtrate portion which passes through the screening surface.

3. An apparatus as claimed in claim 1 wherein said axis inclines upwardly from the inlet end towards the outlet end at between 0 and 5 degrees from horizontal.

4. An apparatus as claimed in claim 1 wherein said outlet end has a first diameter, and said outlet opening has a second diameter selected so that the ratio of the second diameter to the first diameter is less than 2:3.

5. An apparatus as claimed in claim 4 wherein the diameter of the outlet opening is adjustable.

6. An apparatus as claimed in claim 1 wherein each of said inlet opening and said outlet opening are centered on said axis.

7. An apparatus as claimed in claim 1 wherein said frustoconical member is coupled to said cylinder for rotation therewith, said frustoconical member further including vane means on its interior surface for assisting in moving portions of said influent which do not pass through the screening surface towards said outlet opening.

8. An apparatus as claimed in claim 7 wherein said vane means are spaced from the outlet end towards the outlet opening.

9. An apparatus as claimed in claim 1 wherein said cylinder includes at least one vane member disposed about its interior, said at least one vane member for assisting in moving portions of said influent which do not pass through the screening surface into the frustoconical member, and positioning means for adjusting the position of said at least one vane member on the interior of the cylinder.

10. An apparatus as claimed in claim 1 wherein said frustoconical member comprises a plurality of connectable frustoconical segments, each of which successively reduces in diameter whereby the diameter of said outlet opening may be adjusted by the selective addition or removal of one or more of said segments.

11. An apparatus as claimed in claim 1 wherein said influent comprises wood pulp, and said screening surface comprises a woven wire mesh screen.

12. A rotary screening apparatus for increasing the solid content of influent, said apparatus comprising, a hollow cylinder having a central axis oriented at approximately 0° to 40° inclination from horizontal, the cylinder journalled for rotation about the central axis and including an inlet end, an outlet end having a first diameter and a generally cylindrical wall comprising substantially in its entirety a screening surface, inlet end covering means for covering said inlet end, said inlet end covering means extending from the cylindrical wall radially inwardly towards the axis and defining an inlet opening spaced towards said axis, outlet end covering means for covering said outlet end, the outlet end covering means extending from the cylindrical wall, radially inwardly towards the axis and defining an outlet opening spaced towards said axis, said outlet opening having a second diameter selected so that the ratio of the second diameter to the first diameter is less than 2:3, said outlet end cover means comprising a frustoconical member disposed over said outlet end, said frustoconical member extending radially inwardly from the outlet end to said outlet opening in a direction away from said inlet end, and further comprising a plurality of connectable frustoconical segments, each of which successively reduces in diameter whereby the diameter of said outlet opening may be adjusted by the selective addition or removal of one or more of said segments, conveying means for delivering said influent into the interior of said cylinder via said inlet opening, and rotation means for rotating said cylinder about the axis.

13. An apparatus as claimed in claim 12 wherein said axis inclines upwardly from the inlet end towards the outlet end at between 0 and 5 degrees from horizontal.

14. An apparatus as claimed in claim 12 wherein said frustoconical member is coupled to said cylinder for rotation therewith, said frustoconical member further including vane means on its interior surface for assisting in moving portions of said influent which do not pass through the screening surface towards said outlet opening.

15. An apparatus as claimed in claim 12 wherein said cylinder includes at least one vane member disposed about its interior, said at least one vane member for assisting in moving portions of said influent which do not pass through the screening surface into the frustoconical member, and positioning means for adjusting the position of said at least one vane member on the interior of the cylinder.

16. An apparatus as claimed in claim 12 wherein said influent comprises wood pulp, and said screening surface comprises a woven wire mesh screen.

17. A rotary screening apparatus for increasing the solid content of influent, said apparatus comprising, a hollow cylinder for at least partially drying a portion of influent which is retained therein, said cylinder having a central axis oriented at approximately 0° to 40° inclination from horizontal, the cylinder journalled for rotation about the central axis and including an inlet end, an outlet end and a generally cylindrical wall comprising substantially in its entirety a screening surface for separating a filtrate portion of said influent from said retained portion, inlet end covering means for covering said inlet end, said inlet end covering means extending from the cylindrical wall radially inwardly towards the axis and defining an inlet opening spaced towards said axis, outlet end covering means for covering said outlet end, the outlet end covering means extending from the cylindrical wall, radially inwardly towards the axis and defining an outlet opening spaced towards said axis, conveying means for delivering said influent into the interior of said cylinder via said inlet opening wherein said retained portion is at least partially dried by the movement of said filtrate portion outwardly from said cylinder, via said screening surface, rotation means for rotating said cylinder about the axis, and said outlet end cover means comprising a frustoconical member disposed over said outlet end extending radially inwardly from the outlet end to said outlet opening in a direction away from said inlet end, wherein in use, said frustoconical member maintains a minimum layer of said influent in said cylinder to further assist in filtration.

18. An apparatus as claimed in claim 17 wherein said influent comprises wood pulp, and said screening surface comprises a woven wire mesh screen.

19. An apparatus as claimed in claim 17 wherein said axis inclines upwardly from the inlet end towards the outlet end at between 0 and 5 degrees from horizontal.

* * * * *